Jan. 17, 1933.  W. A. FLUMERFELT  1,894,309
JOINT
Filed Dec. 7, 1931
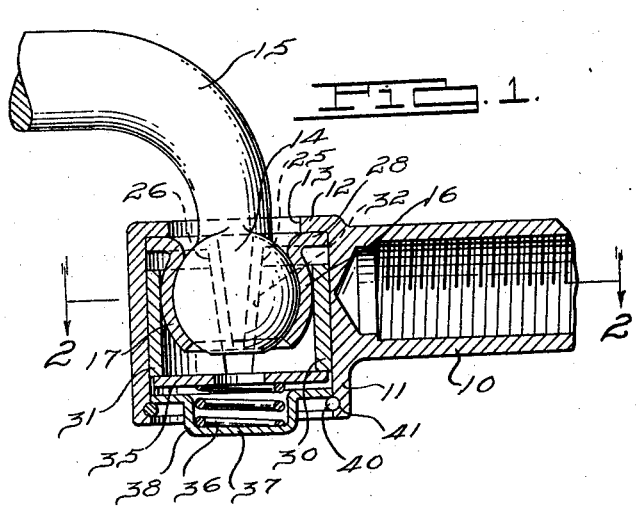
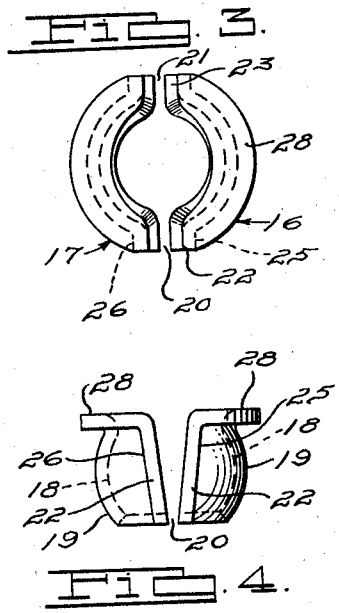
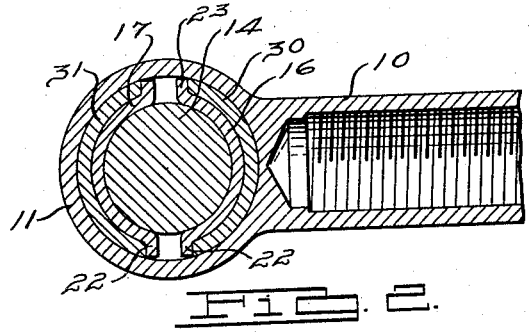
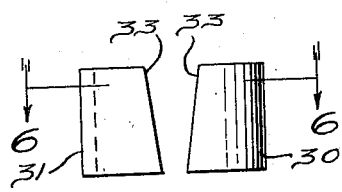
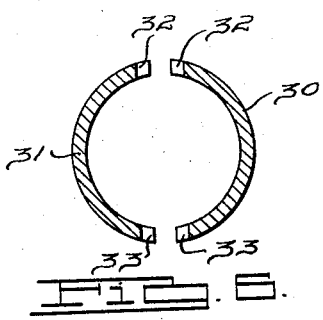
INVENTOR
William A. Flumerfelt
BY
Harness Dickey Pierce & Hann
ATTORNEYS.

Patented Jan. 17, 1933

1,894,309

UNITED STATES PATENT OFFICE

WILLIAM A. FLUMERFELT, OF COLUMBUS, OHIO, ASSIGNOR TO COLUMBUS AUTO PARTS COMPANY, A CORPORATION OF OHIO

JOINT

Application filed December 7, 1931. Serial No. 579,469.

The invention relates to joints and it has particular relation to a joint of the ball and socket type.

In certain respects the invention is related to my co-pending application for patent, Serial No. 466,963, filed July 10, 1930.

The principal objects of the invention are to provide an improved joint of the ball and socket type in which the parts may be readily assembled and disassembled, thereby facilitating making the connection between elements adapted to be connected by joints of the ball and socket type; to provide a ball and socket joint having ball seats which may be stamped from sheet metal; to provide a ball and socket joint in which the housing and the ball seats therein are so constructed and arranged, that wedges for automatically holding the seats against the ball, may be so shaped that they can be manufactured by stamping them from sheet metal; and in general to provide a ball and socket joint of inexpensive and durable construction, which will last indefinitely for the purpose of maintaining an operatively tight ball and socket connection between elements adapted to be connected thereby.

For a better understanding of the invention, reference may be had to the accompanying drawing, forming a part of the specification, wherein:

Figure 1 is a longitudinal cross-sectional view of a ball and socket joint constructed according to one form of the invention;

Figure 2 is a cross-sectional view taken substantially along the line 2—2 of Figure 1;

Figure 3 is a plan view of the ball seats as seen when isolated from the remaining part of the joint;

Figure 4 is a side elevational view of the seats shown by Figure 3;

Figure 5 is an elevational view of the wedge members utilized for maintaining the ball seats against the ball;

Figure 6 is a cross-sectional view taken substantially along the line 6—6 of Figure 5.

Referring to Figure 1, a tie rod is indicated at 10, and is provided at one end with a cylindrical housing 11. This housing is open at both ends, but at its upper end as shown, has an annular, inwardly extending flange 12, the inner periphery of which defines a smaller opening 13. The opening 13 is of such diameter that a ball portion 14 of a steering rod 15 for example, may be inserted through the opening and into the housing. For seating the ball in the housing a pair of ball seats 16 and 17 are provided at opposed sides of the ball respectively, these seats being best shown by Figures 3 and 4. The body portion of each seat has an inner, spherically formed surface 18 and an outer, spherically formed surface 19, and each seat generally, is of semispherical form. When the seats are located in their operative positions with respect to the ball 14, spaces 20 and 21 are provided between the edges of the seats to permit their movement toward each other and hence adjustment with respect to the ball.

Each of the ball seats, at its side edges, has outwardly directed flanges 22 and 23 and the flanges on adjacent edges of the seats, diverge upwardly to provide wedging surfaces 25 and 26 at the remote sides of the flanges. Also each of the ball seats has an outwardly directed flange 28 extending around and from its upper edge, these flanges abutting the inner side of the annular flange 12 on the housing 11, with their edges substantially abutting the inner surface of the housing wall. The ball seats, when arranged in the housing around the ball 14, are so located that the outermost points on the outer spherical surfaces 19 are spaced sufficiently from the adjacent wall surfaces of the housing 11, to accommodate wedge members 30 and 31 which are generally of semi-cylindrical shape. As best shown by Figures 5 and 6, each of the wedge members 30 and 31 has its edges inclined as indicated at 32 and 33, and the adjacent edge faces of the wedge members diverge upwardly as shown by Figure 5 so as to cooperate with the wedging faces 25 and 26 on the ball seats.

For normally urging the wedge members 30 and 31 upwardly, a plate 35 is provided in the housing which engages the lower edges of the wedge members and such plate is urged against the latter by means of a helical spring 36. This spring is centrally located with respect to the plate and is seated in a pressed out portion 37 of a cover plate 38 which may be slipped into the open end of the housing 11 opposite that end having the flange 12. A split retaining ring 40 which seats in a groove 41 in the inner surface of the housing below the edge of the cover 38, is utilized for normally retaining the cover associating with the housing.

Constructing the ball seats and wedge members in this manner permits manufacture thereof from sheet metal, by means of stamping operations well known to those skilled in the art. During normal operation of the joint, the flanges 28 on the ball seats substantially abut the inner wall of the housing, and hence will prevent the seats from moving apart and consequently prevent accidental separation of the tie rod with respect to the rod 16. It is apparent that the wedging members will normally tend to move the ball seats toward each other by reason of the engagement between such wedging surfaces 32 and 33 and the wedging surfaces 25 and 26 on the ball seats and consequently that an operatively tight connection will be provided at all times. It, of course, will be understood that the spring 36 acting through the plate 35, will normally urge the wedge members upwardly to automatically move the ball seats toward each other as wear occurs. Attention is directed to the fact that these wedging surfaces both on the ball seats and the wedging members are located in planes which intersect the ball.

The joint may be assembled by inserting the ball end of the member 15 through the opening 13, until the ball projects through the other end of the housing, then the seats and wedge members may be located properly and the parts moved toward the opening 13 until properly positioned, and then the cover and spring may be associated with the joint. It is apparent that a long steering rod or the like, having an integral ball may be utilized, or that a short ball stud may be utilized, which is adapted to be subsequently connected to a rod.

A ball and socket joint of the type described may be manufactured inexpensively and will operate to maintain an operatively tight connection between the tie rod and steering rod, or between any other rods that may be connected by means of a ball and socket joint of this character. Moreover it is apparent that the parts cooperating with the ball and housing are so designed that they may be manufactured from sheet metal, thus simplifying manufacturing operations considerably.

Although only one form of the invention has been disclosed and illustrated in detail, it will be apparent to those skilled in the art that various modifications may be made without departing from the scope of the appended claim.

I claim:

A ball and socket joint comprising a housing, a ball member in the housing, a ball seat having a semi-spherical shell portion for receiving a part of the ball, flanges on opposite edges of the seat and directed in the same plane and at an angle to one wall of the housing, a wedging member between the seat and housing wall, and having legs wedgingly engaging the flanges on the seat, the semi-spherical shell portion of the seat being disposed between such legs, and means for normally urging the wedging member into wedging relation with the flanges on the seat.

WILLIAM A. FLUMERFELT.